Sept. 18, 1962 K. F. BORNHORST 3,054,581
FLIGHT CONTROL APPARATUS
Filed July 2, 1957 5 Sheets-Sheet 1
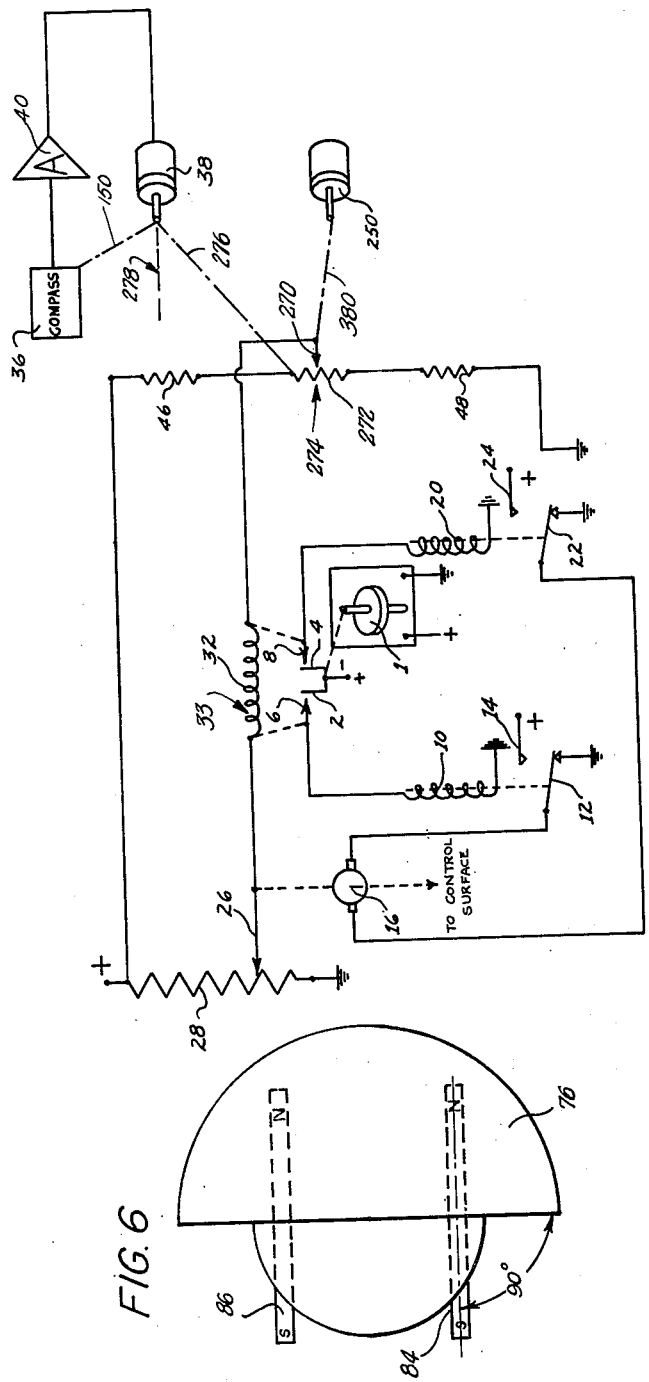
INVENTOR
KENNETH F. BORNHORST
BY Milton E. Gilbert
HIS ATTORNEY Sept. 18, 1962  K. F. BORNHORST  3,054,581
FLIGHT CONTROL APPARATUS
Filed July 2, 1957  5 Sheets-Sheet 2

INVENTOR.
KENNETH F. BORNHORST
BY  *Milton E. Gilbert*
HIS ATTORNEY

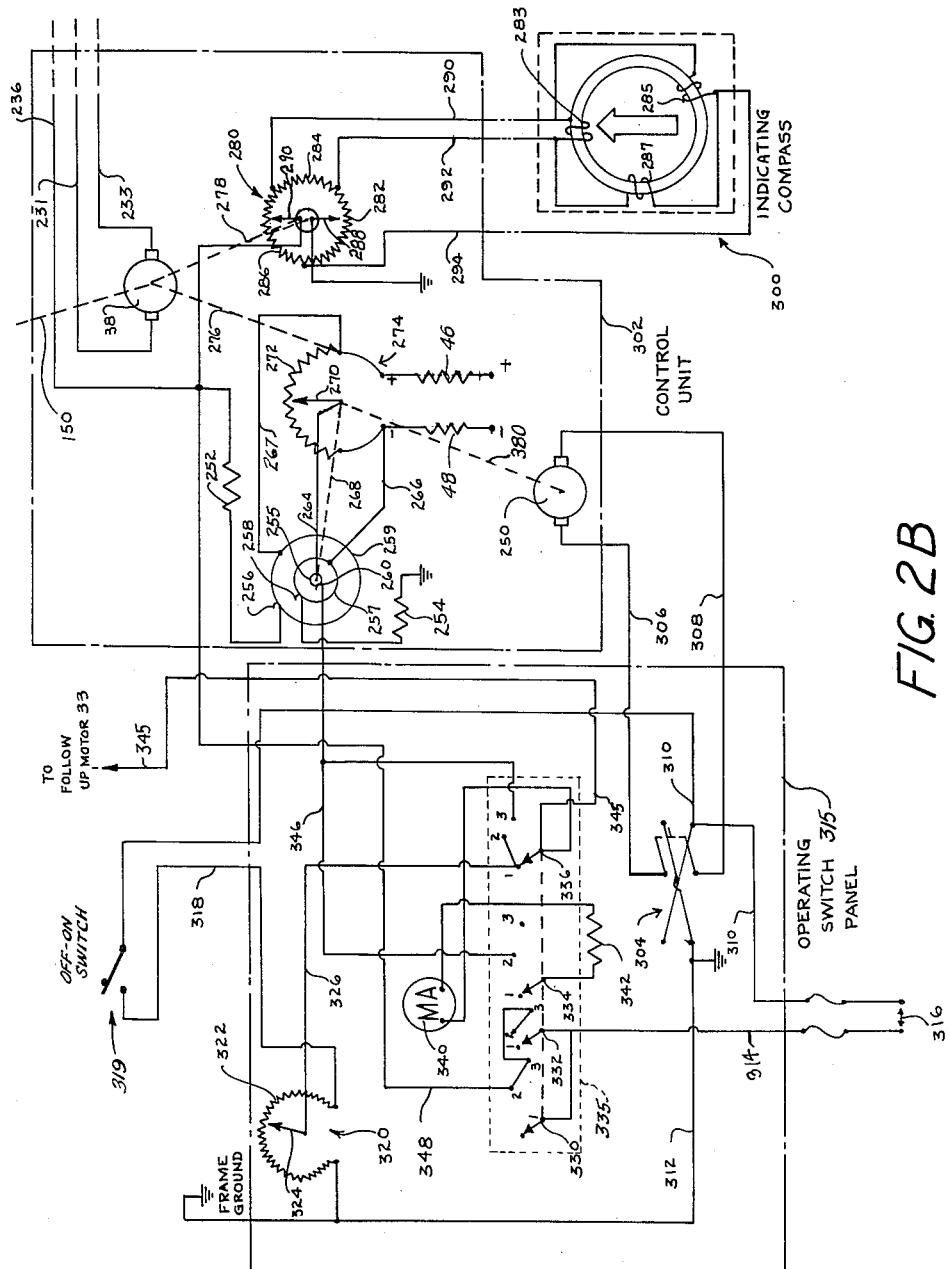

INVENTOR
KENNETH F. BORNHORST
BY
HIS ATTORNEY

Sept. 18, 1962  K. F. BORNHORST  3,054,581
FLIGHT CONTROL APPARATUS
Filed July 2, 1957  5 Sheets-Sheet 5

INVENTOR
KENNETH F. BORNHORST
BY
HIS ATTORNEY

3,054,581
FLIGHT CONTROL APPARATUS
Kenneth F. Bornhorst, Dayton, Ohio, assignor to Globe Industries, Inc., Dayton, Ohio, a corporation of Ohio
Filed July 2, 1957, Ser. No. 669,533
9 Claims. (Cl. 244—77)

This invention relates generally to control systems applicable in the directional control of conveyances. The invention is herein further described as applied in the control of aircraft, however, it will be appreciated that the invention may also be applied to other types of craft utilizing servo control devices for effecting maneuverability.

The control of an aircraft may be resolved about three mutually perpendicular axes. Yawing or turning movement of the craft takes place about a vertical axis (termed the yaw axis), such movement being generally effected by applying left or right rudder. The axis about which the aircraft rotates is termed the roll axis and is disposed longitudinally of the craft and perpendicular to the vertical axis. Movement about the roll axis is generally controlled by the ailerons, which are simultaneously operated in opposite directions, i.e., one moves up as the other moves down, to produce cumulative torques about the roll axis. The direction of flight of the craft vertically is considered as movement about a pitch axis which passes laterally of the craft and is perpendicular to the aforenamed axes at the point of intersection thereof. By moving the elevators, the craft is tilted longitudinally about the pitch axis for a dive, a climb, or level flight by means of a change in the angle of attack of the wing airfoil.

The ability of an aircraft to be turned by simple application of the rudder depends in some measure upon the aerodynamics thereof. An inherently stable craft upon the application of rudder, and the skidding movement which follows, will tend to accumulate the bank angle necessary for equilibrium in the indicated turn. An important function of an aircraft flight control system with which this invention is concerned, is to fly the aircraft straight on a given heading. To this end the control must be quick to sense minor departures from fixed referenced positions and/or velocities about the turn axis.

Control devices for automatically effecting control of small aircraft usually include gyroscopes to detect errors in flight from the predetermined flight pattern. Such gyroscopes have been of the position type (i.e. a displacement gyro) which have been disposed on the aircraft to detect changes in flight attitude and generate a displacement signal from the predetermined normal condition of flight, which when applied to suitable servo systems (including drive or control motors), operate various control surfaces of the craft to correct its attitude and return it to a normal or desired attitude. On such systems which include directional gyros, however, control of the craft is accomplished only over a short term period, since directional gyros are subject to precession or "creeping" off the set course, thereby necessitating frequent re-setting of the gyro. Thus, over long term flight periods, it has been found that the craft will drift off a desired course.

Other types of devices heretofore provided for controlling the craft's magnetic heading during or after a turn of the craft have either been based upon the use of magnetic compasses, flux valve compasses or rate of turn integrating devices. Rate of turn integrating devices are subject to certain inherent integration errors so that the final indication is either less or more than the actual angle of turn traversed by the craft. To correct for these types of shortcomings in flight control systems a displacement gyro together with a rate gyro were used in conjunction with a magnetic or flux valve compass, in order to hold a desired heading. In such systems, the signal put out by the displacement or directional gyro is modified by a correction signal put out by a magnetic or flux valve compass to correct for drift. The signals from the corrected displacement or directional gyro and the rate gyro were then used in a well known manner to control various control surfaces of the craft. In certain instances systems employed three sets of such directional and rate gyros together with compasses and other position reference means for each of the three control axes, i.e. turn, bank and pitch systems. Obviously, such systems become large and cumbersome, and in relation to small aircraft, units as thus constituted would require too much space and weight, so that presently there are no effective systems to simply and economically provide heading control for small craft.

In employing magnetic compasses of the pendulous type in aircraft control systems, it is noted that they are oscillatory in response and hence, are practically useless for indicating the continuous change in magnetic heading during turn. It is therefore necessary to stabilize a pendulous type of magnetic compass before it can be employed in aircraft control systems.

Whenever a pendulous type of magnetic compass is mounted on a craft which experiences side or lateral components of acceleration, the pendulous action of the card assembly causes the card to tilt from the true vertical. Since the earth's magnetic field has a vertical as well as a horizontal component, the compass card assembly tends to rotate when tilted becaues the earth's vertical field then has a component perpendicular to the rotational axis of the card assembly. As soon as the card assembly has begun to rotate, the craft utilizing the compass no longer has a heading reference. This phenomenon is commonly referred to as "northerly turning error." This problem is encountered not only in optical compasses for manual steering, but also occurs in remote indicating types used for manual and automatic steering of crafts. Various suggestions have been made to minimize northerly turning error in pendulous type magnetic compasses such as utilizing a spherical bowl, a small card and large bowl; and damping the card assembly by controlling the compass fluid viscosity and the magnet strength, or by adding damping vanes to the card assembly.

It is one object of the invention to provide a system of flight control for a small aircraft wherein the craft is caused to follow a desired course on a pre-determined magnetic heading. Another object of the invention is to provide a system of the type mentioned in which a stabilized magnetic compass is employed. A still further object is to provide a stabilized magnetic compass. Another object of the invention is to employ a signal from a stabilized magnetic compass to directly control by means of servo motors, the operation of the control surfaces of a craft. These and other objects and advantages of the invention will become more readily apparent upon a study of the following disclosure when taken in conjunction with the accompanying drawings, in which:

FIGURE 1 is a schematic diagram embodying the fundamental principles of the invention;

FIGURE 2B is a continuation of the wiring diagram of FIGURE 2A;

FIGURE 6 is a view taken along line 6—6 of FIGURE 3.

Figure 2A:
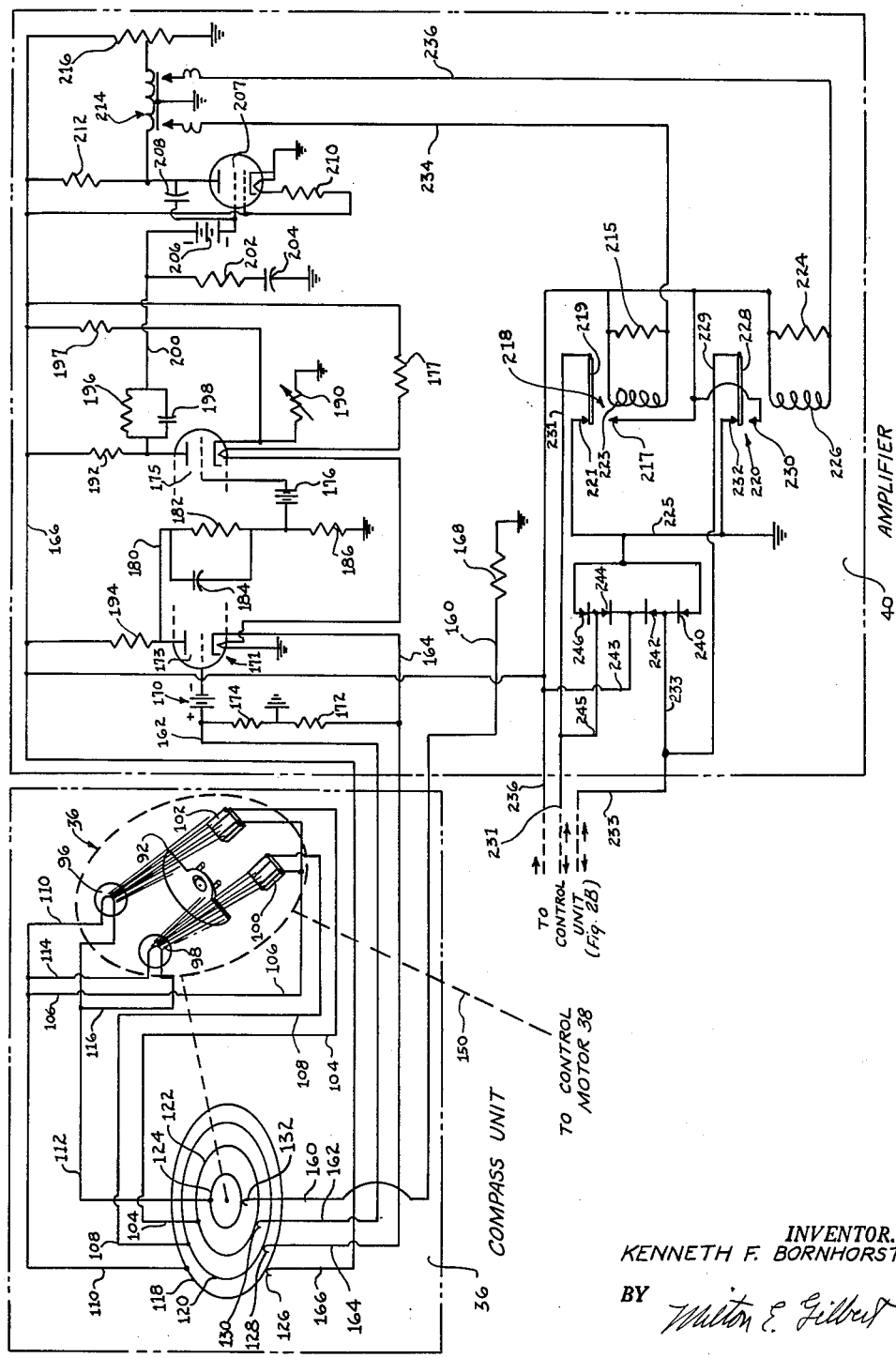
FIGURE 2A is a wiring diagram, partially in schematic form, of the control system.

The elementary features of the present invention are set forth in FIGURE 1. The system shown is essentially a gyro stabilizer system. When connected with the magnetic compass it operates to maintain the heading of the craft fixed in response both to the directional signal produced by the compass and to the signal produced by a rate gyroscope.

As shown in FIGURE 1, a rate gyroscope 1 has a pair of contacts 2 and 4 mounted at one end of its mounting shaft. A pair of contacts 6 and 8 are mounted in juxtaposition to the contacts 2 and 4, respectively. The rotation of the gyro 1 during its sensing movement operates to either move contact 2 into engagement with contact 6 or contact 4 into engagement with conact 8. In the normal position of the gyro 1, the contacts 2 and 4 are out of engagement with the contacts 6 and 8. These contacts are connected to a suitable source of electrical energy, which may be a direct current or an alternating current system. When the contact 2 engages the contact 6, a relay 10 is energized to close the switch 12 by engaging the contact 14, thus energizing a servo motor 16 and causing it to rotate in a given direction. When the contact 4 is engaged with the contact 8, a relay 20 is energized to close a switch 22, by engaging a contact 24. In this event, the movable contact element 12 is grounded so as to close the circuit through the servo motor 16. The current then flows through the servo motor in the opposite direction, thereby reversing the direction of rotation of the servo motor. The servo motor 16 is mechanically coupled to a sliding contact 26 of a potentiometer 28. The sliding contact 26 is moved over the windings of the potentiometer according to the direction of rotation of the servo motor 16. The potentiometer 28 is connected in parallel with another potentiometer 274, so as to form a normally balanced circuit including both potentiometers 28 and 274, and a winding 32 of a torque or follow-up motor 33. When the bridge circuit is balanced, no current flows through the follow-up motor winding 32, i.e., the voltage drop between the source of electrical energy and the contact 26 is equal to the voltage drop of that portion of the potentiometer winding 272 located between the energy supply system and the sliding contact 270. When the bridge circuit is unbalanced, current will flow through the follow-up motor winding 32 to actuate the motor and drive the contacts 6 or 8 (as the case may be), out of contact with the opposed contacts 2 or 4 (as the case may be) in accordance with the excitation of the coil 32, as controlled by the position of the wiper 26 driven by the servo motor 16. Thus, until the servo motor 16 positions the control surface so that the gyro signal is nullified, the follow-up motor 32 will not have moved the contacts 6 and 8 to such a position that they would be out of contact with their opposed contacts 2 and 4, as the case may be. The magnetic heading is sensed by the compass 36 which feeds a signal to the control motor 38 via an amplifier 40. This control motor 38 serves to drive the winding 272 of the potentiometer 274 to unbalance the circuit previously referred to. The resistances 46 and 48 (see FIGURE 1) in series with the command pot 274 serve to limit the maximum rate of turn which the system will generate to approximately 1½° per second. This reduces the amount of lateral acceleration experienced by the compass. The turn potentiometer 274 is so mounted with slip rings so that either the winding 272 or the slider 270 may be rotated independently through 360°. The wiper 270 of this potentiometer 274 is moved by or upon rotation of motor 250, whereas the winding 272 of the potentiometer 274 is moved in accordance with movements of the compass 36. When it is desired that the aircraft make a turn to a new desired heading, the winding 272 of the potentiometer 274 is moved, resulting in an unbalance of the bridge circuit. This introduces a correcting turn in the control surfaces as effected by the servo motor 16. By coupling the winding of the potentiometer 274 to the compass with a unity gear ratio, there is provided a "heading memory" when it is desired to switch the system to a standby state for a manual change in heading of the aircraft, as more fully described hereinafter.

The heading sensing instrument 36 is a highly stable, pendulous type of magnetic compass. High directional stability of this compass is assured by heavily damping the card assembly with very viscous fluid, by making the bowl smooth and a perfect sphere, by making the card to bowl diameter ratio small, by properly locating the card assembly center of gravity with respect to the pivot and by coupling the bowl to a follow-up system which prevents the bowl from turning through any net angle as the aircraft turns, i.e. the speed of response of the follow-up system is greater than the maximum rate of turn of the aircraft. The compass is equipped with a light source emitting substantially parallel light rays and two photo-conductive cells arranged in a bridge circuit. The compass card is so arranged that it operates as a shutter for the light rays and any tipping thereof does not result in false signals. The output of this latter bridge circuit is coupled to the amplifier 40 which controls the motor 38 that positions the compass bowl. The compass card shutter allows equal light to each photo cell when the bowl is positioned correctly.

In the illustrated embodiment of the invention, the compass is not used directly as a visual instrument, and visual indication may be obtained by means of an electrical remote indicating system. The sensory pick-offs, which may be the photo conductive cells mentioned above, determine relative displacement of the bowl with respect to the card. This displacement signal is amplified by the amplifier 40 and the information then applied to the motor 38 which positions the compass bowl through the mechanical connection 150 (see FIGURE 2A), so as to result in a zero angular displacement between the bowl and the card. This essentially comprises a servo in which the angular position of the compass bowl (i.e., the output quantity) is monitored and compared with the position of the compass card (i.e., the desired position), with the difference between the two positions (i.e., the error or displacement signal) being used to actuate the system (i.e., motor 38) to generate a rate of change of the output (i.e., reposition the compass bowl). This servo is a "velocity type" servo since, as will be readily understood by one skilled in the art, of the three components of error in a servo (i.e., position of the output member, output acceleration and output velocity), the output velocity error in the servo of the invention is zero. This means that the bowl is repositioned substantially simultaneously in a stepped motion at the same velocity as the error signal, i.e., the following error is essentially negligible. However, there is an acceleration error and a position or displacement error. The servo of the invention can therefor be termed a "velocity" servo. The effect of this system is that rotation of the craft about the yaw axis does not produce rotation of the compass card, which would ordinarily result from coupling of the fluid between the bowl and the card. The cut-off frequency (defined as that frequency at which the response of the servo is such that the output signal begins to lag in phase with the input signal) of this velocity type servo is greater than the maximum instantaneous turning rate of the vehicle so that the bowl and card do not get out of phase. The minimum detectable error between the card and bowl angular displacement should be held as low as possible, and in the system illustrated in the drawings a dead-band of from 0.2° to 0.25° has been used. The motor 38 is a constant speed motor, and the steady state speed of the bowl is much greater than the maximum instantaneous turning rate of the craft. By using such an arrangement greater economy of weight can be obtained by applying full forward power, and then at the proper time applying full reverse power, so that the motor stops at the proper position in a minimum time. The frequency of the start and stop of the motor is much higher than the natural frequency of the card assembly so as not to result in any unwanted rotation of the card.

The location of the center of gravity of the card assembly with respect to the pivot height is dictated by the angle of pitch and roll the vehicle will experience, and also the change in the dip angle of the earth's field, which will in turn cause the card to become unbalanced from the vertical. Generally, the lower the center of gravity is with respect to the pivot, the less the effect the dip angle will have on the tilt of the card. However, the lower the center of gravity, the more pendulous will be the card assembly, which results in greater northerly turning error. Therefore, the higher the location of the center of gravity, the greater will be the damping in the vertical plane. However, the center of gravity must be below the pivot, or else the card will be top heavy. Damping in the vertical plane is necessary in order to prevent tilting of the card when the vehicle experiences a coordinated turn or other lateral accelerating force.

Figure 3:
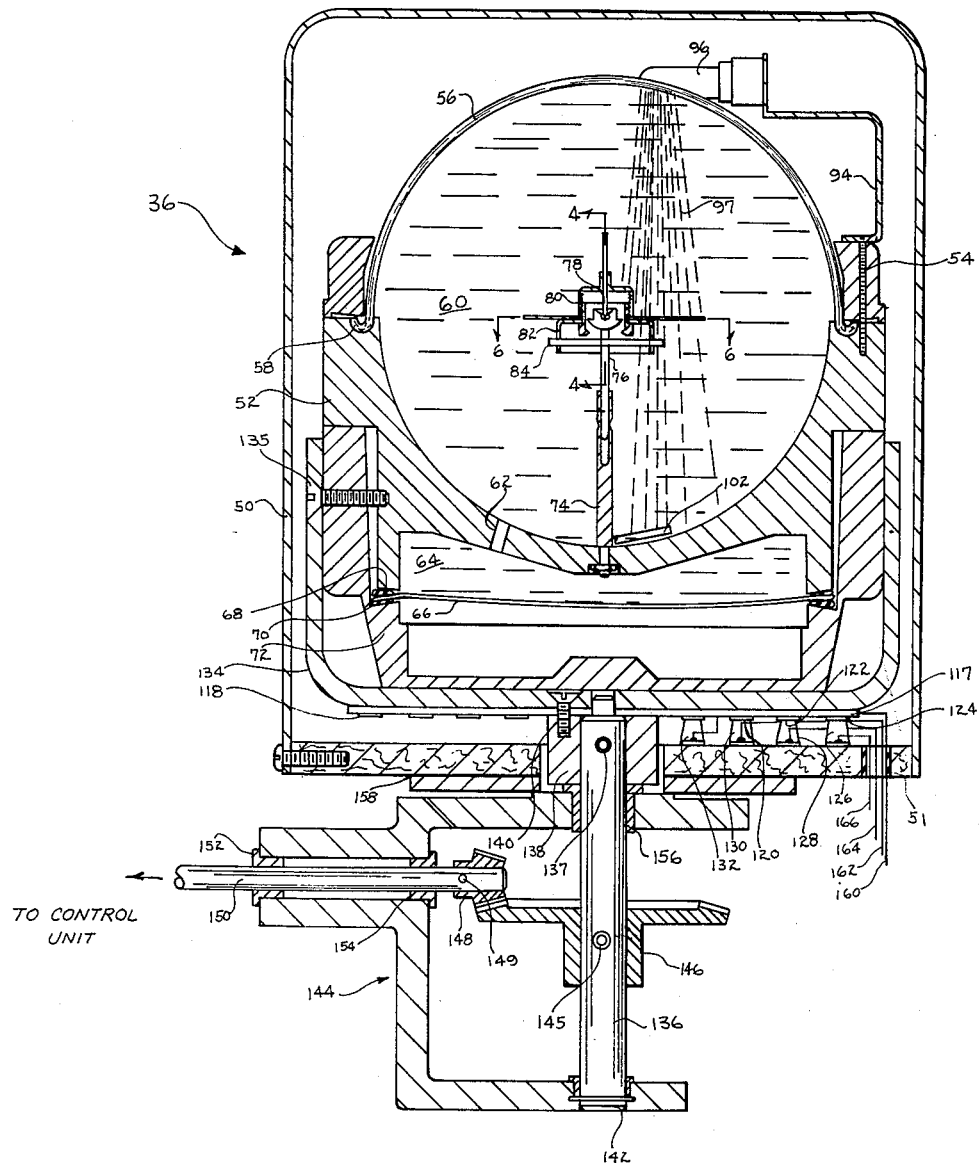
FIGURE 3 is a cross-sectional view of the stabilized magnetic compass of the invention.
Figure 4:
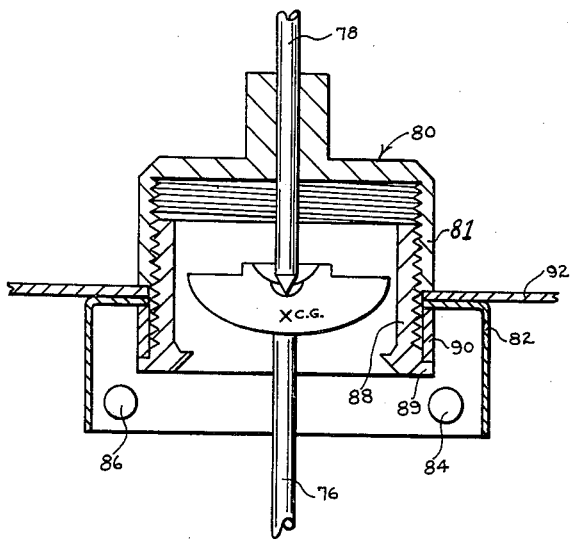
FIGURE 4 is a sectional view taken along line 4—4 of FIGURE 3.

The magnetic compass 36 is more clearly illustrated in FIGURES 3, 4 and 6. The compass is housed in a cylindrical housing 50 which is mounted on a base plate 51. The compass itself includes a cup-shaped base 52 of brass, aluminum, phenolic or other non-magnetic material. Secured to the base by a series of fastening means 54, is a hemispherical light transmissive shell or bowl 56 provided with an annular shoulder 58 dimensioned to fit snugly into the base 52. The inner wall of the bowl 56 is as close as possible to a true hemisphere, so that together with the base 52 a substantially perfect sphere is formed, which will not impair the ability of the liquid filling it to freely roll about, thus preventing swirling and turbulent agitation of the liquid. The compass bowl is filled with a damping fluid 60, whose viscosity is so chosen, with respect to the magnet strength that the card will not rotate when it tilts. The fluid should have a constant viscosity over a wide temperature range. A fluid which has been found to be particularly apt for this purpose is the General Electric Silicone SF–96/40, sold by the silicone Products Dept. of Waterford, New York, which has a viscosity of 40 centistokes or 189 SSU at 100° F. The base 52 has an opening 62 therein communicating with a reservoir chamber 64. The chamber 64 is sealed by an expensible flexible member 66 which is suitably sealed and held by O-rings 68, 70 between the base 52 and the mounting plate 72. The volume of fluid in the expansion chamber 64 changes as the liquid expands or contracts in response to changes in temperature. Secured to the center of the base member 52 is a vertical metal post 74 projecting upwardly as a hollow piller and receiving the stem of a jeweled pivot cup 76. After initial adjustment to center the card in the bowl the post 74 and stem 76 are crimped together, as shown in FIGURE 3. The pivot cup cooperates with a cone point pivot pin 78 mounted in a shallow metal cup housing 80 (see FIGURE 4). A bracket or frame 82 is provided with a depending skirt portion for holding a pair of bar magnets 84 and 86.

The card 92 and the frame 82 are mounted in the cup housing 80, by the threaded engagement of upper housing member 81 and lower housing member 88. The lower housing member 88 has an outwardly extending flange 89. A spacer or washer 90 is positioned on the flange 89 and the card 92 and magnet frame 82 are held between the spacer 90 and lower end of upper housing member 81 when the housing members are assembled. By this arrangement the center of gravity of the compass card system can be raised up with respect to its pivot point. As indicated above, the card 92 operates as a shutter. As clearly seen in FIGURE 6, the card takes the shape of a half circle. The diametrical edge of the card 92 is perpendicular to the longitudinal axis of the bar magnets 84 and 86. The center of gravity of the compass card system is indicated by a cross mark in FIGURE 4, and it lies below and close to the pivot point of the pin 78. By locating the center of gravity close to and below the pivot point of the compass card system, the card system is balanced to take care of the vertical component of heel, i.e. to cancel out the vertical field, at the latitude in which the compass card assembly is balanced. Since the compass is now much less pendulous, when side accelerations occur the card will not tilt, appreciably. When the craft goes from an extreme north to an extreme south latitude the compass card described will tilt relatively an appreciable amount. However, since the instrument is not used as an optical compass, and since the compass card is arranged as a shutter in the manner illustrated in FIGURE 6 (with the pick-offs so positioned as described hereinafter in connection with the description of FIGURES 2A and 3) the tilting of the card will not disturb the pick-off system. The card will therefore not move into or out of the light rays. The light source used essentially is a point source of light which approximates the use of parallel light rays. As seen in FIGURE 3 the lamp bulb 96 is mounted on a bracket 94 which is held by fasteners 54 onto the base of the compass. The bracket 94 carries a pair of lamp bulbs 96 and 98 (see FIGURE 2A). The light rays 97 generated by the lamp bulb 96 are transmitted through the shell 56 and impinge upon the card 92. Some of the light rays pass by the card 92 and fall upon the photo cell 102. The card 92 also acts as a shutter for the light rays emitted by lamp 98 and falling upon photo cell 100. The compass card is thus arranged in the form of a double shutter so that when the card and bowl have zero relative displacement, each photo conductive cell has the same conductivity and the bridge circuit in which they form the variable resistance components, is balanced. Various photo conductive cells may be employed. For example, one such photo cell is a lead-sulfide photo conductor sold by the Eastman Kodak Co. of Rochester, New York under the name "Ektron Detector." Another photo conductive cell which may be used is of the cadmium-sulfide type and is marketed by the Tube Division of Radio Corporation of America at Harrison, New Jersey and designated as type 6694-A. Another cadmium-sulfide type of photo conductive cell which may be used is marketed by the Canadian Marconi Co. of Montreal, Canada and is designated as type PC1.

The mounting plate 72 is affixed by fastening means 135 to a disc shaped bracket 134. The members 134, 72, 52 and 56 constitute the bowl assembly. The bowl assembly is connected to shaft 136, which can be rotated by the control motor 38 through shaft 150, by a means described hereinafter. A disc 117 is mounted on the bottom of the bracket 134 and may be made of phenolic material, or other non-electrically conductive material. Embedded or mounted on this disc 117 is a series of slip rings 118, 120, 122 and 124. Bearing against these slip rings are brushes 126, 128, 130 and 132. These brushes may simply be thin metal strips which are bent to have a spring-like action, the ends of which bear against the respective slip rings. The brushes are affixed to the plate 51 of the compass housing and are electrically connected by means of conductors 160, 162, 164 and 166. These conductors are affixed to the brushes as shown in FIGURE 3. The conductors to the brushes pass through an opening in the base 51.

Mounted to the bowl assembly by a fastener 140 is a hub or bushing 138. This bushing is affixed to the shaft 136 by a pin 137. Thus upon rotation of shaft 136, the bowl assembly is caused to rotate. The shaft 136 is mounted in a bracket member 144 which has a lower and an upper extension. The bushing 156 in the upper extension permits the shaft 136 to pass therethrough and acts as a sleeve bearing, and the lower end of shaft 136 fits into the lower extremity of the bracket 144 in a slip ring mounting 142.

Pinned to the shaft 136 by a pin 145 is a gear 146. Meshing with gear 146 is a gear 148 which is pinned to shaft 150 by a pin 149. The shaft 150 is mounted by bushings 152 and 154 in the bracket 144.

The electrical circuit of the heading control system of the invention is shown in FIGURES 2A and 2B. The lamps 96 and 98 are wired in parallel. The lamp 96 having leads 110 and 112 leading therefrom, and the lamp 98 being wired across leads 110 and 112, by leads 114 and 116, respectively. Lead 110 is affixed to slip ring 118 and lead 112 is affixed to slip ring 124. Lead 106 is connected to lead 110 and interconnects the photo cells 100 and 102. Photo-cell 100 has a lead 108 which is affixed to slip ring 120, and photo-cell 102 has a lead 104 which is affixed to slip ring 122. As indicated above, the brushes 126, 128, 130 and 132 bear against slip rings 118, 120, 122 and 124 respectively. Leading from the brushes 126, 128, 130 and 132 are the lead lines 166, 164, 162 and 160, respectively. The latter connections interconnect the compass unit 36 with the amplifier 40. The dotted line surrounding the compass elements shown in FIGURE 2A designates the compass bowl, which is mechanically interconnected to the control motor 38 by the interconnection 150. FIGURE 2A also shows the mechanical interconnection between the compass bowl and the slip rings.

The lead 160 is grounded to resistor 168. This resistor 168 serves to lower the voltage of the lamps slightly. This enables the lamps to have a longer life. The amplifier includes a duo-triode 171. The lead 162 and the lead 164 inter-connect the triode 171 with the photocells 100 and 102. The control grid voltage source or grid bias 170 is in line 162. Lead 164 is connected to the cathode of one side 173 of the triode 171. The filaments of each side 173 and 175 of the triode 171 are connected in series. The grid and cathode of the side 173 of the tube 171 are therefore connected by lines 162 and 164, respectively across the bridge formed by the photo-cells 100 and 102 and the fixed resistances 172 and 174. Actually, therefore, the tube 171 has a push-pull input with a single ended output. When this bridge circuit, including the photo-cells is unbalanced, i.e. rotation of the card 92 causes an unequal distribution of the light from bulbs 96 and 98 on the photo-cells 100 and 102, a signal is introduced into the triode 171. Resistors 192 and 194 are plate load resistors for the sides 175 and 173 of the triode respectively. Capacitor 184, resistor 182 and resistor 186 comprise a rate network. This rate network prevents oscillation in the inner loop consisting of compass 36, amplifier 40 and motor 38. The E.M.F. source 176 biases the grid of the other side 175 of the triode. Resistor 196, capacitor 198, resistor 202 and capacitor 204 comprise a rate integral network which also helps to prevent oscillation in the inner loop. The output of the rate network 182, 184 and 186 is connected to the control grid of the side 175 of the triode 171, and the output of the rate integral network 196, 198, 202 and 204 is fed into the control grid of the tetrode 207. The tetrode 207 actually forms one element of a bridge for a sensitive relay. Resistor 177 serves to lower the filament voltage of the filaments in the duo-triode 171 to give it longer life. The variable resistor 190 is a zero adjustment for the amplifier. With the input shorted out the adjustment is made so that the micro-positioner 214 is not closed. Lead 166 from brush 126 connects to the variable resistor 216. The resistor 216 in the preferred embodiment, is an adjustable potentiometer, and forms the other side of the bridge in which the micro-positioner 214 is connected. The resistor 210 serves to lower the filament voltage of the tetrode 207. The potentiometer 216, when once adjusted, acts as a fixed resistor and together with fixed resistor 212 forms one leg of the micro-positioner bridge. The other leg is formed by the coil of the micro-positioner 214 and the plate of the tetrode 207. The tube 207 therefore acts as a variable resistor. Actually, the DC output of the tetrode 207 serves to actuate the micro-positioner coil, and the resistances 212 and 216 can be considered as a means for balancing out the D.C. current to the micro-positioner. Both contacts of the micro-positioner 214 are normally open, and when actuated, either one or the other contact of the micro-positioner is engaged.

In re-capitulating the operation of this portion of the amplifier, it is readily seen that an output signal from the photocell bridge is fed into, or detected by the side 173 of the duotriode 171. The amplified signal from this triode is fed through the line 200 to the tetrode 207, which then serves as a means for actuating the micro-positioner 214. As described hereinafter the micro-positioner serves as a means for actuating the control motor 38, through a series of secondary relays.

As indicated above, the output of the tube 171 is used together with the source 206 to bias the space charged grid of the tetrode 207, which is a space charged glass tube. The resistor 210 is a voltage reducing means for the filament of the tetrode 207 and is similar to the resistance 177 for the filaments of the triode 171. The capacitance 208 serves to provide a reverse feedback which reduces chattering of the relays.

As stated above, the micro-positioner 214 operates one of the secondary motor relays 218 and 220. The elements 215 and 224 are thyrite varistors. As indicated above, the contact element of the micro-positioner 214 is pivotally mounted so that either current flows through line 234 or line 236, but never both at the same time. Thus either the relay 218 or 220 is actuated. When either of the micro-positioner contacts open and voltage is taken off the relay coils 223 or 226 a large back voltage surges through them and either of the varistors 215 or 224, as the case may be, serves to cut down this back voltage by acting essentially as a short circuit when a large voltage surges therethrough. The varistors merely act as a high resistance at the operating voltage of the amplifier. The varisters, therefore, serve to protect the contacts of the micro-positioner. Relay 218 comprises the actuating coil 223, the movable contact element 219, and the contacts 217 and 221. The relay 220 comprises the actuating coil 226, the movable contact element 228, and the fixed contacts 230 and 232. As indicated above, current flows either through line 234 or line 236 to actuate either the relay 218 or the relay 220, respectively. When the relay 218 is actuated, current may then flow from line 236 through contacts 217 and 219 to line 231. When relay 220 is energized, current may then flow from line 236 through contact 230, 228, line 229 to line 231. In the inactivated position the relays 218 and 220 are grounded through line 225. The current flowing in line 236 energizes the amplifier and also the compass through line 166 and line 110.

As shown in figure 2B, the control motor is actuated when either the relay 218 or 220 is energized, and in opposite directions. As indicated above, when the relay 218 is energized current flows from line 236 through line 231 to the motor and then out from the motor in line 233 to line 229 and return through the contacts 228 and 232 of the relay 220. When relay 220 is energized the motor is reversed since current will now flow into the motor through line 229 and 233 and flow from the motor to line 231 through the contacts 219 and 221 of the relay 218, and return.

The rectifiers 240, 242, 244 and 246 constitute a full wave rectifier bridge, which is connected in such a manner that normally with the control motor 38 shut off and neither relay 218 or 220 closed, the rectifier will not be conducting, since it is connected across the power supply in the back direction, i.e. the current flow is through line 243 from the bridge to line 236. When either relay operates so that the control motor is actuated, the rectifier still does not conduct, but when the relays are inactivated and their contact arms released, the back voltage from the motor armature is of such a polarity (i.e. the rectifier bridge 247 has its cells arranged in such a direction) that the forward conduction of the cell actually shorts out the back voltage from the motor, thus protecting the contacts of the secondary relays 218 and 220. The amplifier unit 40 will therefore emit a forward or reverse current flow to the control unit 302, to operate the control motor 38.

As described above, the control motor 38 has a mechanical drive 150 which operates the compass bowl. The control motor 38 also has two additional mechanical drives 276 and 278. The mechanical connection 276 drives a winding 272 of a trim potentiometer 274. The mechanical connection 278 drives the wipers 288 and 290 of a directional transmitter 280, which is part of a D.C. selsyn system. The transmitter windings 282, 284 and 286 cooperate with the receiver windings 283, 285 and 287 of an indicating or repeater compass 300 via transmission lines 290, 292 and 294, in a well known manner. Therefore, as signals are generated by a change in magnetic heading as detected by the photo-cell bridge the amplified signal (which is used to activate the control motor 38) causes a directly proportional indication by the compass 300.

A trim motor 250 drives the wiper 270 of the trim pot 274 by means of a mechanical interconnection 380. This trim motor 250 is actuated by a single pole-double throw switch 304 in the operating switch panel, in order to cause the craft to make a left or a right turn. The rotation of the wiper 270 causes actuation of the control surface by the servo motor 16 as indicated in FIGURE 1 and as explained more fully hereinafter.

Mechanically affixed to the trim pot 274 by the connection 268 are a set of slip rings 255, 257 and 259, i.e. they rotate together. The slip ring 255 is connected to the wiper 270 by a lead 264; the slip ring 257 is connected by a lead 266 to one side of the winding 272; and slip ring 259 is connected by a lead 267 to the other side of the winding 272. The brushes 260, 258 and 256 bear against the slip rings 255, 257 and 259, respectively. Resistor 252 in line 236 leading from brush 256 serves to limit the rate of turn which the system can introduce to the rate gyro stabilizer, and also sets the gain of this system, i.e. the amount of degrees of rudder per degree change in heading. The resistor 254 leading from brush 258 serves the same purpose as the resistor 252, i.e. it serves to set the voltage per turn of the potentiometer, which when acting through the bridge circuit of the gyro-stabilizer serves to control the degrees of rudder, i.e. if the winding 272 moves 1° per change of heading the rudder will be moved a fixed number of degrees to counteract that.

The polarity reversing switch 304 is manually operated to actuate the control motor 250 in one direction or the other. The current in leads 306 and 308 will flow in the direction determined by the side to which the switch is thrown. Current will then flow through lines 310 and 312. As indicated in the drawing, line 312 is negative and line 310 is positive. Power from a manually operable switch 319, on the servo unit operates a manual trim turn potentiometer 320 through a line 318. The current flow is from power source 316 through line 310 to one side of the switch 304 and then out to the micro-switch, and back from the micro-switch through line 318 to the winding 322 of potentiometer 320, through the winding 322 to ground. The wiper 324 of the potentiometer 320 is connected by a line 326 to position 1 of deck 336 of a four deck-three position switch 335.

The switch 335 comprises the four decks 330, 332, 334 and 336. The wipers of each of these decks can be moved into three positions which are indicated in FIGURE 2B as positions 1, 2, and 3. Position 1 is the gyro-stabilizer position, position 2 is the stand-by position and position 3 is the heading-lock engaged position. When the switch 335 is in position 1, the wiper 324 of the potentiometer 320 is connected to the deck 336 so that current may flow from line 318 through the winding 322, wiper 324 and lead 326 to the deck 336 and then via lead 345 to the follow-up motor. In position 2 the trim meter 340 is in the circuit by its connection to deck 336 and deck 334. The resistance 342 converts the milliammeter 340 into a trim voltmeter. In position 2 of the switch 335 (stand-by position), the wiper 324 of the potentiometer 320 is still connected to the follow-up motor through deck 336, and the trim indicator meter 340 now reads the voltage between the wiper 324 of the manual trim-turn potentiometer 320 and the wiper 270 of the motor driven trim turn potentiometer 274 (which is connected to position 2 of deck 334 via lead 346). The switch 304 is operated until the trim indicator meter 340 is centered, after which time the switch 335 is placed into position 3, which is the heading-lock position. In position 3 the trim meter 340 is switched out of the circuit.

Decks 330 and 332 are merely wired in parallel and when the wipers of these decks are switched into either positions 2 or 3 the power supply is connected to the heading lock system through line 348, and line 236. When the heading lock system is engaged in position 2 or 3 of the switch 335, the system operates automatically to maintain the desired heading as determined by the pre-set condition of the manually operated trim potentiometer 320 and the reversing switch 340. If a change in course is desired it is merely necessary to momentarily flip the switch 304 which results in a change in heading.

Figure 5:
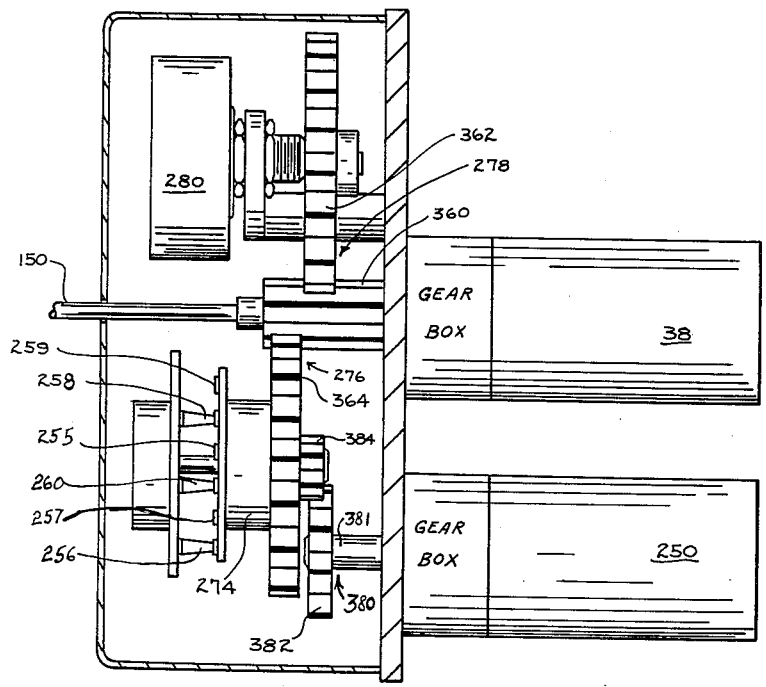
FIGURE 5 is a cross sectional view through the control unit of the system.

FIGURE 5 illustrates one convenient method of mounting the control motor 38 and the trim motor 250. As described above, in connection with FIGURE 2B, the mechanical connection from trim motor 250 is indicated by the numeral 380. As seen in FIGURE 5, the mechanical connection 380 comprises an output shaft 381 from the motor 250 which has a gear 382 mounted on the end thereof. This gear 382 meshes with a pinion 384 mounted on the shaft of a wiper 270 of the potentiometer 274. The control motor 38 has two mechanical outputs 276 and 278 as indicated in FIGURE 2B. As seen in FIGURE 5 the mechanical interconnection 276 comprises a pinion 360 which meshes with gear 364 which drives the winding on the potentiometer 274. The mechanical interconnection 278 comprises the gear 360 which meshes with gear 362 to drive the wipers of the transmitter potentiometer 280. The output shaft of the control motor 38 is designated 150 in FIGURE 5 and corresponds with the output shaft indicated in FIGURE 3. The slip rings 255, 257 and 259 and the brushes 260, 258 and 256 referred to in FIGURE 2B are clearly shown in FIGURE 5.

The system may be operated so as to provide various functioning arrangements. If it is desired to operate the gyro-stabilizer unit alone, with the turns controlled by a manual trim-turn control, it is only necessary to place switch 335 in position 1 and have the power turned on to the gyro-stabilizer (see FIGURE 1). If it is desired merely to use the system to obtain stable and accurate indications of magnetic heading from the remote compass indicator 300, it is only necessary to place switch 335 in position 2 and turn the power off to the gyro-stabilizer. If it is desired to employ both the remote compass indicator and also the gyro-stabilizer then switch 335 is placed in position 2 and the power is turned on to the gyro-stabilizer.

In order to operate the system wherein the heading control is coupled to the gyro-stabilizer, the craft should first be operated with the gyro-stabilizer unit actuated and the craft manually trimmed for straight flight. The switch 335 is then placed in position 2 to allow the unit to warm-up for a short time and to allow the remote compass indicator to become stabilized. The magnetic heading trim indicator meter 340 is then centered by throwing switch 304 to the right or left, as indicated by meter 340. The switch 335 is then place in position 3 and the heading of the craft is then under the control of the magnetic compass 36, with the indicator 300 indicating the craft's magnetic heading.

If it is desired to change the heading of the craft the trim switch 304 is depressed for a right or left turn as desired. If, during the course of a flight, it is desired to circle, or change heading for a short time, and then return to the original heading, this may be done by placing switch 335 in position 2 and manually controlling the craft either directly or through the gyro-stabilizer. When it is desired to return to the previous heading, it is merely necessary to turn the power on to the gyro-stabilizer circuit (if this is not already the condition,) and place switch 335 in position 3.

Although I have described preferred embodiments for carrying out the principles of the invention, it will be readily understood that modifications thereof may be made by those skilled in the art without departing from the broader spirit and scope of the invention so defined in the appended claims. For example, the system may be an A.C. system employing an A.C. amplifier 40 driving an A.C. control motor 38.

I claim:

1. Apparatus for controlling the heading of a craft, said craft having suitable control means operable to effect rotation thereof about its turn axis, comprising, in combination: electrically operated means for operating said control means, an electrical circuit including a birdge the legs of which comprise a first and a second variable resistance respectively, said electrically operated means being interconnected to control said first variable resistance, means in the diagonal of said bridge for actuating said electrically operated means upon bridge unbalance, gyroscope means having the axes thereof disposed with respect to the turn axis of said craft so as to have a rotational torque in dependence upon the velocity of angular movement of said craft about the turn axis, said means in the diagonal of said bridge being responsive to the rotational movement of said gyroscope means for producing an electrical quantity for energizing said electrically operated means to vary the resistance of said first resistance, a stabilized magnetic compass means inter-connected to vary the resistance of said second resistance when the heading of said craft departs from a pre-determined heading, whereby said control means are operated in accordance with variations in the resistance of said second resistance and upon rotation of said gyroscope, in turn resulting in a rebalancing of said bridge upon actuation of said electrically operated means.

2. The apparatus of claim 1 wherein said compass means includes a rotatably mounted bowl and a pivotally mounted northerly seeking card element, pickoff means adapted to generate a signal upon relative displacement of said bowl and card element, a second control means adapted to receive said signal from said pickoff means and vary the resistance of said second resistance and simultaneously to reposition the bowl element of said compass to eliminate the signal from said pickoff means.

3. The apparatus of claim 2 wherein said pickoff means comprises a pair of light sources arranged above the card element one on each side of a vertical line running through the pivot point of said card element, the card element being so constructed and arranged as to serve as a shutter for the light rays emanating from said sources; a pair of light sensitive resistance elements arranged below the card element, one in the path of the light rays from one of said light sources and the other in the path of the light rays from the other of said light sources, the resistance elements being mounted for movement with the bowl, a second electrical bridge circuit including a pair of fixed resistors and said light sensitive elements, said bridge generating a signal upon relative displacement of said shutter with respect to said bowl, said electrical means being adapted to receive the signals from said bridge.

4. Apparatus for controlling the heading of a craft, said craft having suitable control means operable to effect rotation thereof about its turn axis, comprising, in combination: electrically operated means for operating said control means, an electrical circuit including a bridge the legs of which comprise a first and a second variable resistance respectively, said electrically operated means being interconnected to vary the resistance of said first resistance, a stabilized magnetic compass comprising a spherical bowl, a northerly seeking card element, a cardanic mount including a pivot bearing suspending said card element in said bowl, a liquid filling the bowl for damping said element when it or the bowl moves, the ratio of the diameter of the card meter to the internal diameter of the bowl being small and less than 1:2, said pivot bearing and card element constituting a card assembly, the center of gravity of said card assembly being so located with respect to the pivot as to provide for maximum damping of the card assembly in the vertical plane, a velocity type servo means interconnecting said bowl and card element having a cut-off frequency greater than the maximum instantaneous turning rate of the craft whereby the bowl and card element are maintained in phase, sensory pick-off means associated with the compass and adapted to generate a signal upon relative displacement of the bowl with respect to said card element, said servo means including means for varying the resistance of said second resistance in accordance with said displacement signal, whereby said control means are operated in accordance with variations in the resistance of said second resistance and in turn resulting in a rebalancing of said bridge upon actuation of said electrically operated means.

5. Apparatus for controlling the heading of a craft, said craft having suitable control means operable to effect rotation thereof about its turn axis, comprising, in combination: electrically operated means for operating said control means, an electrical circuit including a bridge the legs of which comprise a first and a second variable resistance respectively, said electrically operated means being interconnected to vary the resistance of said first resistance, means in the diagonal of said bridge for actuating said electrically operated means upon bridge unbalance, gyroscope means having the axes thereof disposed with respect to the turn axis of said craft so as to have a rotational torque in dependence upon the velocity of angular movement of said craft about the turn axis, said means in the diagonal of said bridge being responsive to the rotational movement of said gyroscope means for producing an electrical quantity for energizing said electrically operated means to vary the resistance of said first resistance, a stabilized magnetic compass comprising a spherical bowl, a northerly seeking card element, a cardanic mount including a pivot bearing suspending said card element in said bowl, a liquid filling the bowl for damping said element when it or the bowl moves, the ratio of the diameter of the card element to the internal diameter of the bowl being small and less than 1:2, said pivot bearing and card element constituting a card assembly, the center of gravity of said card assembly being so located with respect to the pivot as to provide for maximum damping of the card assembly in the vertical plane, a velocity type servo means interconnecting said bowl and card element having a cut-off frequency greater than the maximum instantaneous turning rate of the craft, whereby the bowl and card element are maintained in phase, sensory pick-off means associated with the compass and adapted to generate a signal upon relative displacement of the bowl with respect to said card element, said servo means including means for varying the resistance of said second resistance in accordance with said displacement signal, whereby said control means are operated in accordance with variations in the resistance of said second resistance and in turn resulting in a rebalancing of said bridge upon actuation of said electrically operated means.

6. Apparatus for directing the angular position of a body having freedom of angular movement about at least one axis, comprising control means operable to effect rotation thereof about said axis, electrically operated means for operating said control means, velocity responsive means responsive to the velocity of angular movement of said body about said axis, means operably interconnecting said velocity responsive means to said electrically operated means to thereby effect the operation of the control means, said interconnecting means including an electrical circuit comprising a bridge, the legs of which comprise a first and a second variable resistance respectively, and the diagonal of which includes means for receiving the signal from the velocity responsive means and for actuating said electrically operated means upon bridge unbalance, said electrically operated means being interconnected to vary said first variable resistance, position reference control means providing a continuous position reference control signal for said body, said continuous position reference control signal being impressed upon said second variable resistance to cause unbalance of said bridge and effecting unbalance thereof independently of said velocity responsive means when said body experiences angular movement about said axis, whereby said control means is operated in accordance with signals both from said velocity responsive means and said position reference means.

7. A directional control system for a movable craft having a control surface comprising in combination: servo-motor means for positioning said control surface; a follow-up motor interconnected to contact means adapted to actuate said servo-motor; a rate gyro means mounted on said craft for generating signals proportional to the rate of change of the angular deviation from a pre-determined direction of said craft; electrical circuit means including a normally balanced bridge, said bridge including a pair of variable elements whereby it may become unbalanced; said servo-motor means being interconnected to vary one of said variable elements, said rate gyro signal being imposed to actuate said contact means operatively associated with said bridge and thereby said servo-motor means whereby the control surface may be positioned for short term turn stability; said one variable element being thus controlled by said gyro signal; magnetic compass and control means adapted to generate a position reference control signal, said position reference control signal being transmitted to said other variable element to cause bridge unbalance when said craft deviates from a desired heading or when a new heading is to be attained, whereby the control surface may be positioned for long term turn stability.

8. The control system of claim 7 wherein said other variable element comprises a movable resistance element and a movable wiper element, said position reference control signal serving to vary the position of one of said movable elements.

9. The control system of claim 8 including means interconnected for varying the position of the other of said movable elements whereby the heading of said craft may be changed as desired by operation of said last named means.

References Cited in the file of this patent
UNITED STATES PATENTS

| | | |
|---|---|---|
| 1,585,210 | Roux | May 18, 1926 |
| 1,832,334 | Tarbox | Nov. 17, 1931 |
| 1,834,399 | Helmer et al. | Dec. 1, 1931 |
| 1,929,400 | Schulte | Oct. 3, 1933 |
| 2,075,797 | Blair | Apr. 6, 1937 |
| 2,126,887 | Hodgman et al. | Aug. 16, 1938 |
| 2,351,977 | Kronenberger et al. | June 20, 1944 |
| 2,387,795 | Isserstedt | Oct. 30, 1945 |
| 2,539,411 | Esval et al. | Jan. 30, 1951 |
| 2,775,045 | Kadlec | Dec. 25, 1956 |
| 2,862,169 | Yragui | Nov. 25, 1958 |
| 2,877,967 | Markusen | Mar. 17, 1959 |